United States Patent
Carlson et al.

(10) Patent No.: US 8,126,967 B2
(45) Date of Patent: Feb. 28, 2012

(54) MULTIPLE AGGREGATOR SUPPORT

(75) Inventors: Mark Carlson, Half Moon Bay, CA (US); Pat Stan, Pacifica, CA (US)

(73) Assignee: Visa International Service Association, San Francisco, CA (US)

( * ) Notice: Subject to any disclaimer, the term of this patent is extended or adjusted under 35 U.S.C. 154(b) by 85 days.

(21) Appl. No.: 12/753,429

(22) Filed: Apr. 2, 2010

(65) Prior Publication Data
US 2010/0274853 A1    Oct. 28, 2010

Related U.S. Application Data

(60) Provisional application No. 61/173,371, filed on Apr. 28, 2009.

(51) Int. Cl.
G06F 15/16 (2006.01)
G06F 15/173 (2006.01)

(52) U.S. Cl. ........ 709/204; 709/206; 709/219; 709/223; 709/224

(58) Field of Classification Search .................. 709/204, 709/206, 219, 223, 224
See application file for complete search history.

(56) References Cited

U.S. PATENT DOCUMENTS

| | | | |
|---|---|---|---|
| 6,889,207 B2 * | 5/2005 | Slemmer et al. | 709/219 |
| 6,985,450 B2 * | 1/2006 | Slemmer et al. | 709/206 |
| 7,412,505 B2 * | 8/2008 | Slemmer et al. | 709/223 |
| 7,849,181 B2 * | 12/2010 | Slemmer et al. | 709/223 |
| 2005/0215250 A1 | 9/2005 | Chava et al. | |
| 2007/0107059 A1 | 5/2007 | Chasin et al. | |
| 2007/0124396 A1 | 5/2007 | Febonio et al. | |
| 2009/0092115 A1 | 4/2009 | Zuniga | |
| 2010/0075702 A1 * | 3/2010 | Slemmer et al. | 455/500 |
| 2010/0274853 A1 * | 10/2010 | Carlson et al. | 709/204 |

OTHER PUBLICATIONS

International Search Report for Application No. PCT/US2010/032250, dated Nov. 29, 2010, 5 pages.
International Written Opinion for Application No. PCT/US2010/032250, dated Nov. 29, 2010, 5 pages.

* cited by examiner

*Primary Examiner* — Quang N. Nguyen
(74) *Attorney, Agent, or Firm* — Kilpatrick Townsend & Stockton LLP

(57) ABSTRACT

Systems, methods and communication gateways for delivering timely, cost efficient and scalable user alert messages are disclosed. Using electronic communication media, user alert messages are generated by a communication gateway at the request of a requesting entity, such as a credit card issuer. The alert message is associated with a message identifier and then routed to one or more message aggregators based on the content of the alert message initiation request and a routing table. If the first selection of message aggregators is not available or otherwise unable to deliver the user alert message, then the communication gateway can reroute the user alert message to another message aggregator or queue the message for later delivery. The communication gateway can monitor and log the status and ability of the servicing message aggregator in the routing table to better facilitate timely delivery of the user alert messages.

14 Claims, 6 Drawing Sheets

MULTIPLE AGGREGATOR SUPPORT

CROSS-REFERENCES TO RELATED APPLICATIONS

This application claims priority to Provisional U.S. Patent Application No. 61/173,371, filed on Apr. 28, 2009 and is herein incorporated by reference for all purposes.

BACKGROUND

Sending alerts to users has become increasingly popular with users who want updates and warnings regarding their personal information, associated assets or accounts. Originally, information, messages and alerts sent to users and businesses were delivered by traditional communication channels such as conventional paper-based mail or telephone calls. Such messages are frequently delivered at regular intervals in the form of periodic statements or monthly bills and often include recent activity as well as any miscellaneous announcements or updates. Although they are delivered on a regular basis, statements that are delivered by traditional paper-based mail systems inherently require entities, such as credit card issuers, to collect batches of information before it is sent out to a user or business. For example, credit card issuers traditionally send paper statements through the mail to credit card account holders at the end of a financial period, usually on a monthly basis. The credit card account activity included in the monthly statements is usually days, if not weeks, old due to the delay caused by the generation and delivery of the paper statements. While the information in the monthly statements may be useful, delays in the dissemination of the information for some period of time while the information is collected into a batch can be undesirable in trying to deliver critical or time sensitive information to users.

For instance, if an unauthorized user obtained a user's credit card or credit card number and makes unauthorized purchases, the user would not be alerted to this fact until he or she received and reviewed the monthly statements at a much later time. Some credit card issuers have started to send alerts regarding individual transactions via regular mail, however, due to the delay in generating and delivering paper-based alerts, the unauthorized user would still have ample opportunity to make multiple unauthorized purchases before the user was alerted by the information in the paper-based alert. In addition, there is no way for the alerting entity to cost-effectively or practically confirm delivery of the paper-based alert to the user.

To increase the speed and reliability with which users are alerted to suspicious or potentially fraudulent use of user account or identity information, some entities, such as credit card issuers, offer telephone notification services to contact the user whenever suspicious activity is detected. In such systems, a human operator or an automated system will call the user to alert him or her whenever suspicious activity is discovered in a near to real-time manner. Although such telephone alert systems are effective at quickly delivering alerts to users, they are resource intensive; requiring either many telephone operators or complex automated telephone dialers with access to many relatively expensive telephone lines. As such, telephone alert systems are effectively not scalable or practical for entities that need to service and send alerts to large numbers of users or businesses.

As described above, there is a need for a timely, cost-effective, reliable and scalable solution for delivering alerts to large numbers of users regarding quickly produced alerts for vast amounts of user activity and data. Embodiments of the present invention address this and other needs.

BRIEF SUMMARY

Various embodiments are directed toward a communication gateway for delivering messages. The messages can be alert messages, offer messages, notification messages or some other type of message. The communication gateway includes a server computer having a processor and a computer readable medium coupled to the processor. The computer readable medium has code for causing the processor to implement a method for delivering messages by receiving a message initiation request at the communication gateway, generating a message based on the message initiation request and a routing table. The communication gateway also generates a message ID and associates it with the message. The message and the message ID are then sent to a first message aggregator based on the routing table. The communication gateway then monitors a status code related to the message and the message ID. The communication gateway also includes a communication interface coupled to the processor.

Other embodiments are directed toward a method for delivering messages. The method includes receiving a message initialization request at a communication gateway and generating an alert message based on the message initialization request and a routing table using the communication gateway. The communication gateway generates a message ID and associates it to the message. The communication gateway then sends the message and the message ID to a message aggregator based on the routing table and then monitors a status code related to the message ID.

DETAILED DESCRIPTION

Embodiments of the present invention include systems, methods and a communication gateway for supporting multiple message aggregators in delivering electronic messages to users such as consumers and businesses. Each alert message can be associated with a message identifier (MID) or a transaction identifier (TID). As used herein, the terms MID and TID can be used interchangeably when referring to a message identifier or a message ID. Using various forms of electronic information delivery channels, such as Simple Message Service (SMS), instant messaging, and e-mail, alert messages can be sent to a user by one or more message aggregators, like Verisign® or Clickatell™, etc., using one or more message or communication carriers, such as mobile telephone or data service carriers, like Microsoft Messanger™, Yahoo!™ or Google™. Using the MID, embodiments of the present invention can track or monitor whether a particular alert message was successfully delivered to the intended carrier or user. In the event that one of the message aggregators is offline, overloaded or otherwise fails to deliver a message, embodiments of the present invention can reroute the message to another message aggregator or send it to a queue for the message aggregator to reattempt delivery at a later time. Embodiments of the present invention will be described in more detail in reference to specific examples and figures herein.

Figure 1:
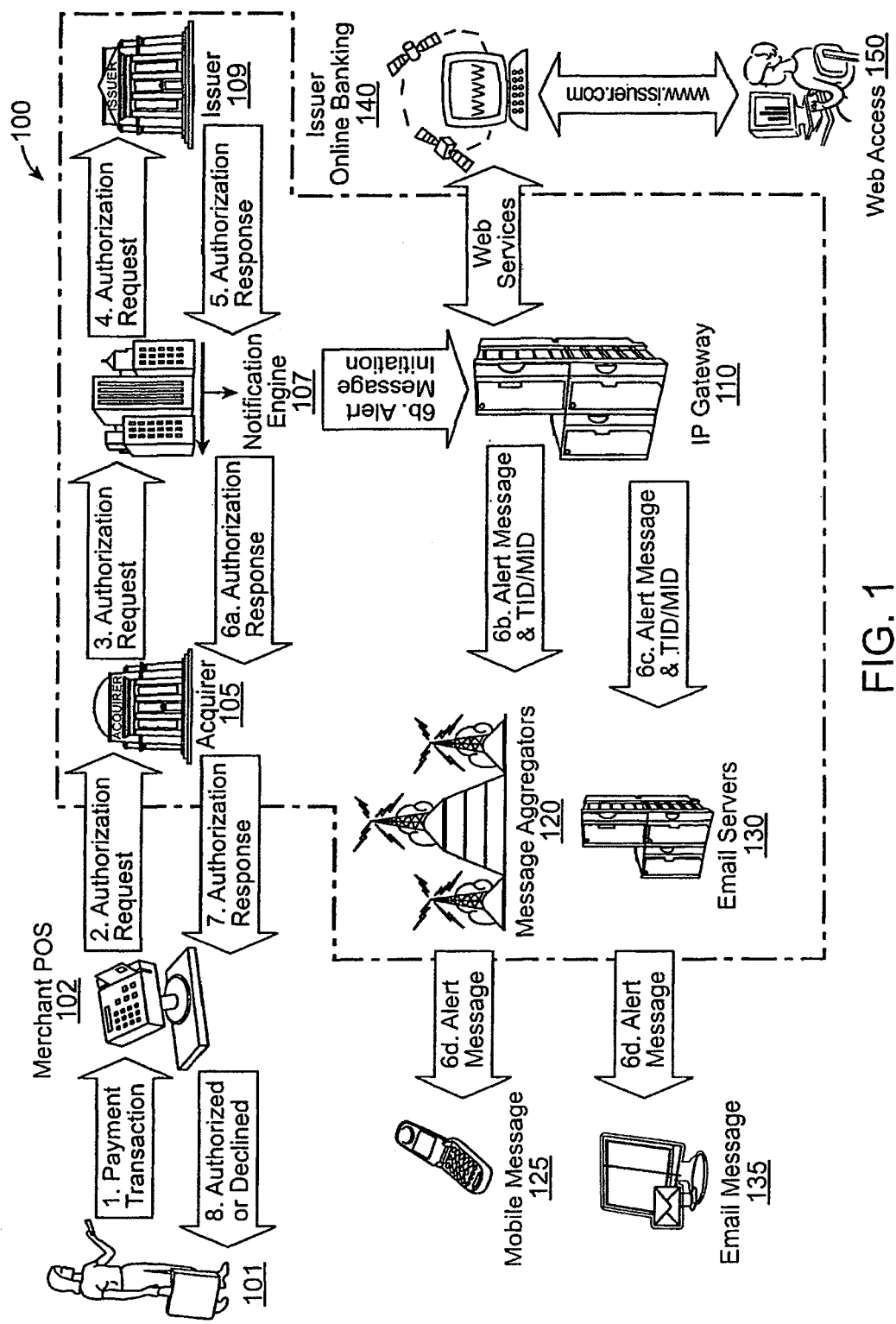
FIG. 1 is a schematic of a system for delivering user alert messages according embodiments of the present invention.

FIG. 1 is a schematic diagram of a system that includes various embodiments of the present invention. Using the payment processing system 100, user 101 can initiate a transaction or account activity, such as a credit card payment transaction in step 1. The transaction can be initiated with a point-of-sale (POS) terminal, such as a credit card terminal, or a mobile telephone. Once the transaction is initiated, an authorization request message is sent to an entity holding or maintaining the account, such as an account acquirer 105 in step 2. Acquirer 105 can reformat the authorization request message into its own authorization request message and send that message to a notification engine 107 in step 3. In other embodiments, acquirer 105 can simply pass on the authorization request message it receives from the POS terminal 102 in step 2. Notification engine 107 can pass on the authorization request message from acquirer 105 and POS terminal 102 to issuer 109 for further authorization and authentication in step 4. Once issuer 109 authenticates or authorizes the transaction or other activity requested in the authorization request message, issuer 109 can send an authorization response to the notification engine 107 in step 5. Once notification engine 107 receives the authorization response message, the process can be bifurcated. In step 6a, notification engine 107 can send an authorization response message to acquirer 105, which in turn can provide an authorization response message to the POS terminal 102 in step 7. In step 8, POS terminal 102 can then inform user 101 or a merchant as to whether the requested transaction or other activity is authorized or declined based on the authorization response message.

Meanwhile, in step 6b, notification engine 107 can also send an alert message initiation request to communication gateway, such as Internet Protocol Gateway (IPG) 110. IPG 110 can use the alert message initiation request from the notification engine 107 to generate an alert message. In some embodiments, IPG 110 can parse out a transaction identifier (TID) or a message identifier (MID) from the alert message initiation request. In other embodiments, IPG 110 can generate a TID or an MID. In either case, IPG 110 can associate each alert message generated with an identifier, such as a TID or an MID.

IPG 110 can then route the alert message and the associated MID to one or more message aggregators 120 or e-mail servers 130 in step 6c. The aggregator to which the alert message and the MID are sent can be based on information contained in the alert message initiation request and information regarding the message aggregators contained in a routing table. For example, the alert message initiation request can request that an alert message be sent out via a Simple Message Service (SMS) protocol, Multimedia Messaging Service (MMS) protocol, e-mail or any other messaging service suitable for delivering high-volume messages quickly, efficiently and reliably. Embodiments in which the alert message initiation request specifies a specific delivery protocol, the IPG 110 can refer to a routing table to determine which message aggregator offers the appropriate delivery protocol. Additionally, the IPG 110 can refer to the routing table to determine other pertinent characteristics and information regarding each available message aggregator or mobile carrier 120 or e-mail server 130. The contents and the use of the routing table will be described in greater detail below.

Embodiments in which message aggregators 120 can route alert messages to one or more mobile communications carriers, such as mobile telephone carriers, message aggregators 120 can format the messages as one or more text, SMS, MMS or other mobile device compatible messages. At step 6d, the mobile communication carriers can send the mobile compatible messages to one or more mobile devices associated with user 101, a business or a representative of the business. In some embodiments, the mobile device 125 can be a cellular telephone, smart phone, pager, two-way-pager or other mobile user device suitable for receiving wireless alert messages.

In other embodiments, IPG 110 can route the alert message and MID to e-mail servers 130 in step 6c. In such monuments, e-mail servers 130 can then route an e-mail message to an e-mail compatible device 135. E-mail compatible device 135 can be a personal computer, a laptop computer, desktop computer, a tablet computer, a smart phone, and e-mail capable mobile telephone or any other e-mail device capable of receiving e-mail.

Figure 2:
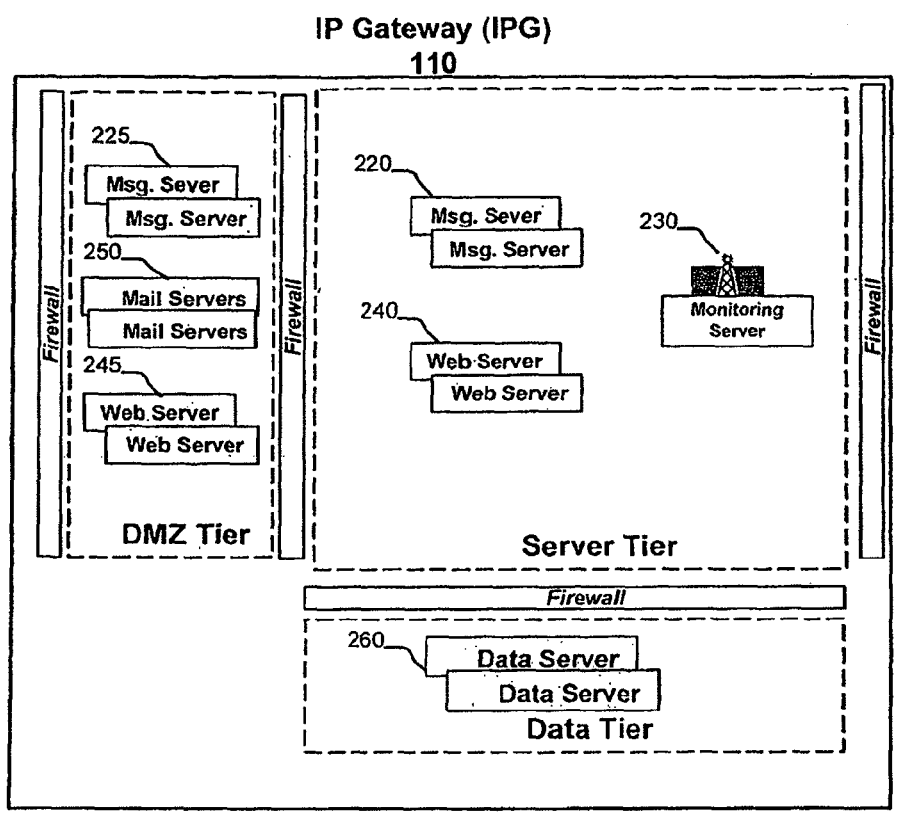
FIG. 2 is a schematic of a communication gateway according to embodiments of the present invention.

FIG. 2 depicts a schematic of IPG 110. In some embodiments, IPG 110 can include one or more tiers where each tier is separated from one another and other components external to IPG 110 by one or more firewalls. IPG Gateway 110 can include a demilitarized zone (DMZ) tier, a server tier and a data tier. The firewall separating the DMZ tier, the server tier and the data tier can be configured to allow one-way or two-way communication between the tiers via one or more communication interfaces.

The server tier can include message servers 220, a monitoring server 230 and Web servers 240. Message servers 220, monitoring server 230 and Web servers 240 can be connected to each other and communicate over any electronic communication medium using any communication protocol suitable for facilitating fast and reliable communication between the servers. Message servers 220 can receive alert message initiation requests from notification engine 107 or directly from acquirer 105 or issuer 109. Alternatively, message servers 220 can receive alert message initiation requests from Web servers 240 from external issuer online banking terminals 140 from a user or other financial institution.

Message servers 220 can parse the content of the alert message initiation request to generate an alert message. The content of the alert message initiation request can vary depending on the source of the alert message initiation request and the intended or requested form of delivery for the alert message. Additionally message server 220 can generate a message identifier (MID) for each alert message generated. Message server 220 can associate the MID with the alert message for which it was generated or the alert message initiation request for which the alert message was generated. Alternatively, monitoring server 230 can generate an MID and associate the MID with the alert message or the alert message initiation request.

The servers in the server tier can communicate with the data servers 260 in the data tier. In some embodiments, the servers in the server tier can receive customized and standardized alert message content from the data servers 260. In some embodiments, the alert message content can be specialized according to the entity sending, receiving, initiating or otherwise associated with the alert message. The specific alert message content can be stored in and retrieved from data servers 260.

Once the IPG 110 generates an alert message and associates it with an MID, either the message server 220 or the Web server 240 can send a message to one or more servers in the DMZ tier. The DMZ tier can include message servers 225, mail servers 250 and Web servers 245. The DMZ tier can be separated from the server tier by a firewall suitable for protecting the data in and of the operation of servers in the server tier. The servers in the DMZ tier to which the message generated by a server in the server tier depends on the intended or requested mode of communication of the alert message. In some embodiments, the intended or requested mode of communication of the message can be specified in the alert message initiation request. For example, if the alert message initiation request specifies that the alert message be delivered via e-mail then the mail server 250 can be used to relay the alert message to one or more e-mail servers 120 according to the e-mail address or URL specified in the alert message initiation request or the alert message. Similarly, if the alert message initiation request specifies that the alert message be sent by SMS protocol, the message server 225 can relay the message from the server tier to an external message aggregator. Once the message aggregator has the alert message, then it can send the message to one or more mobile communication carriers via a communication interface according to the mobile telephone or pager number of the user who is to be alerted.

Figure 3:
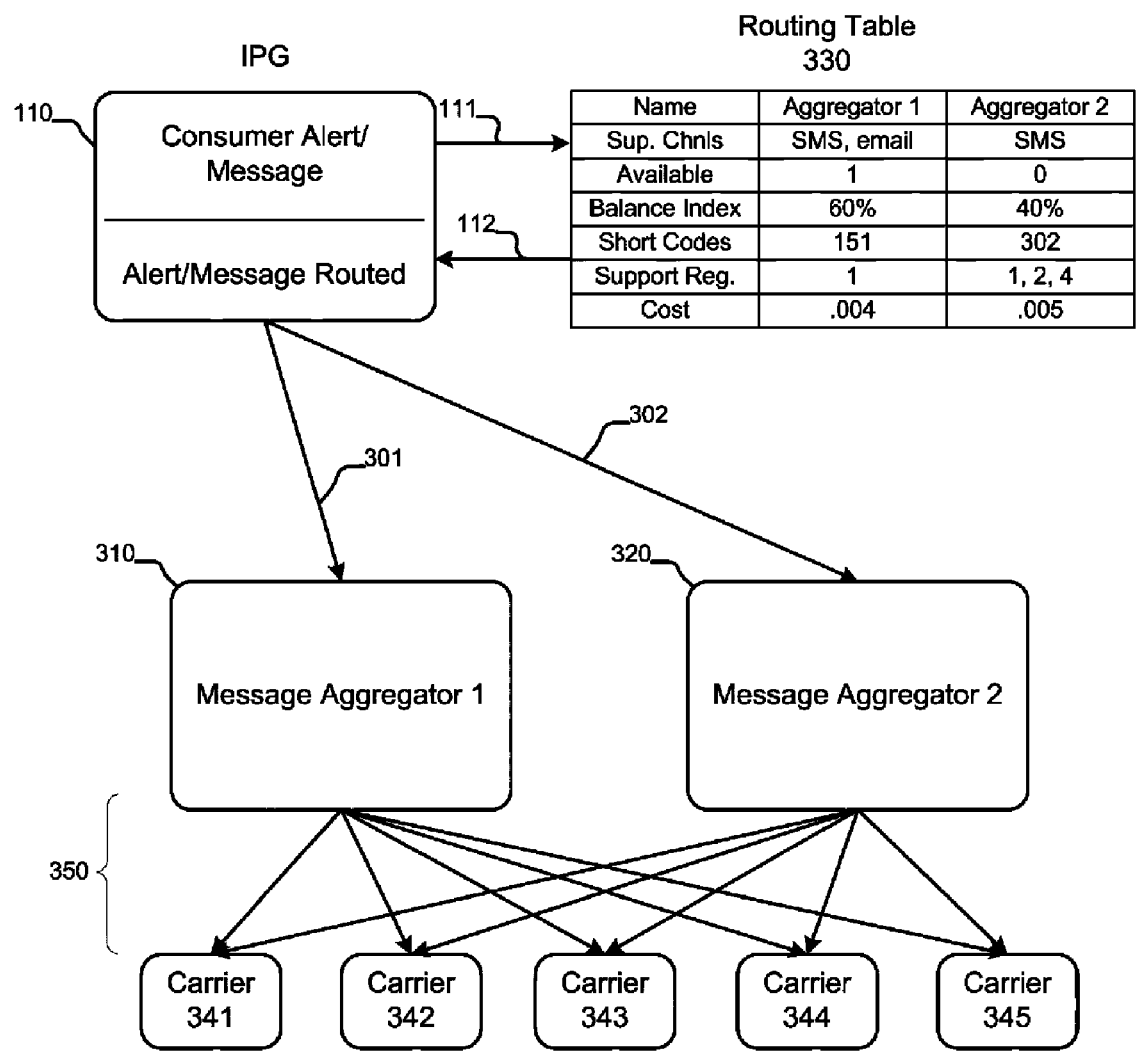
FIG. 3 is a schematic of a system for delivering user alert messages and a representative routing table according to embodiments of the present invention.

FIG. 3 is a schematic of a system for routing alert messages using multiple message aggregators. As described above in reference to step 6b in FIG. 1, IPG 110 can receive an alert message initiation request from the notification engine 107. The notification engine 107 can communicate with multiple entities that may wish to send an alert message. Notification engine 107 can be connected to a payment processing network such that it can initiate an alert message initiation request at the request of multiple entities such as acquirer 105 and issuer 109.

In some embodiments, IPG 110 can parse the data in the alert message initiation request to determine the specifics of the requested alert message to be delivered. IPG 110 can parse out the message contents from the alert message initiation request, however, in other embodiments the alert message initiation request can include information that can be inserted into a template that IPG 110 retrieves from one or more data servers. For example, the alert message initiation request may include a reference to an external template available to IPG 110 and information with which to fill the template. IPG 110 can then retrieve the specified template and insert the information from the alert message initiation requests into the template as the content of the resulting alert message. In such embodiments, IPG 110 can generate the message with the minimum amount of information being transmitted in the alert message initiation request.

In other embodiments, the alert message initiation request can include the entirety of the contents for the alert message supplied by the notification engine 107, the acquirer 105 or the issuer 109. In such cases, the entity requesting the alert message can fully customize or insert security measures into the contents of the alert message to verify the authenticity and origin of the alert message to the user. For example, the contents of the alert message may include a PIN, a password or a passphrase that is known only to the user and the entity with whom the user has previously associated him/herself. Such a level of security gives users at least a first level of confidence in the system to deliver only alert messages initiated by a trusted source.

In addition to the partial or full contents of the requested alert message, the alert message initiation request can include information specifying the mode of delivery to one or more users. The alert message initiation request can also include information specifying a specific communication device, i.e. an e-mail address, telephone number, pager number or other communication device identification or routing number to which the alert message should be delivered. Information specifying a specific communication device can include the information for one or more communication devices or communication channels associated with the user who is to be alerted. In other embodiments, the information specifying a communication device can include information for one or more communication devices or channels associated with one or more users. For example, in a scenario in which parents obtains a credit card for a child, the issuer 109 can offer a service that allows the parents to be alerted on each of their mobile telephones in the form of an SMS message any time that the child's credit card is used to make a purchase in excess of a predetermined amount or outside of a predefined region.

IPG 110 can refer to routing table 330 to determine the appropriate or most expedient aggregator to use for delivery of the alert message. IPG 110 can access two or more message aggregators to ensure that there is always a message aggregator available for a particular delivery address or region. IPG 110 can usually reroute messages to one or more message aggregators to compensate for delivery addresses or regions that might be affected by the failure of or problem with a particular message aggregator. In other embodiments, the use of two or more message aggregators provides IPG 110 with redundant channels through which to send user alert messages. In such embodiments, the likelihood that user alert messages are actually received by the intended recipients is increased if user alert messages are sent through two or more message aggregators and, possibly, through one or more delivery channels. Using multiple message aggregators optimizes the time between the receipt of an alert message initiation request and the time the user alert message is actually delivered to the intended recipient by allowing IPG 110 to choose the least burdened message aggregator through which to send a particular user alert message. Furthermore, by making various message aggregators, which often charge by the message, compete for business on daily, if not hourly basis, they are incentivized to reduce price while improving their response times, connectivity to carriers, regions of service and other factors used by their customers in deciding which message aggregator to use.

In some embodiments, IPG 110 can query a database storing routing table 330, or some other server, in step 111. In response to the query, the database or server can respond with information specifying a specific message aggregator to which the alert message should be sent. In other embodiments, IPG 110 can maintain routing table 330 internally. In embodiments in which IPG 110 maintains routing table 330, IPG 110 can conduct periodic updates of information contained in routing table 330. For example, IPG 110 can update routing table 330 with real-time or batch provided update messages from multiple aggregators. Such functionality allows IPG 110 to maintain access to current information regarding each aggregators' capability, availability, balance index, list of short codes, support registration, cost and other aggregator specific information. IPG 110 can then use this information to efficiently, cost effectively and quickly deliver user alert messages, while also maximizing user alert message content delivery.

As shown, routing table 330 can contain information regarding the status and capability of multiple aggregators. For example, aggregator 1 310 can be listed as an aggregator that supports both SMS messages and e-mail messages. The availability index or availability flag can be flipped from an available indicator such as a "1 flag" or an unavailable indicator such as "0 flag." Additionally, routing table 330 can indicate the balance index or available load capacity. As shown aggregator 1 310 is currently operating at 60% capacity while aggregator 2 320 is operating at 40% capacity. Using the information contained in the alert message initiation request and routing table 330, IPG 110 can then the route the alert message to an appropriate message aggregator such as a message aggregator 1 310 or message aggregator 2 320 over communication lines 301 or 302. Communication channels 301 and 302 can be any electronic communication medium suitable for sending fast, reliable and secure electronic communication files, such as the Internet or other wired or wireless networks.

As previously discussed, each alert message is associated with an MID by which each alert message can be tracked or monitored to verify or reroute the delivery of the alert message. For example, IPG 110 can send an alert message to message aggregator 1 310 to be delivered via an SMS message to a user's mobile device. When message aggregator 1 310 receives an alert message and associated MID, it can then send the message to one or more carriers 341, 342, 343, 344 or 345, over communication channels 350, to deliver the message to one or more communication devices. The carriers can include mobile telephone service providers, mobile data service providers, wired and wireless LAN and WAN service providers or any other service provider capable of delivering a user alert message to a user device such as a mobile phone, pager, PDA, computer or other communication device.

In some embodiments, the carriers can return a confirmation or status code message to message aggregator 1 310 that the message has been delivered successfully to one or more user devices. Message aggregator 1 310 can then return its own confirmation or status code message to IPG 110 to confirm delivery of the user alert message. In the event that message aggregator 1 310 does not receive a confirmation or status code message, the message aggregator may have the capability of rerouting or re-attempting delivery of the user alert message via one or more of the other available carriers. In other embodiments, message aggregator 1 310 can indicate to IPG 110 that it has or has not received a confirmation or status code message from one or more of the carriers. In such embodiments, the indication to IPG 110 that the user alert message was not successfully delivered can include a reference or information specifying the MID and a status code. IPG 110 can then use the MID to regenerate or retrieve a stored copy of the associated user alert message. Once IPG 110 has regenerated or retrieved the associated user alert message IPG 110 can consult routing table 330 once more to route the user alert message to one or more available or operable aggregators. For example, if message aggregator 1 310 either indicates to IPG 110 that the message has failed to be delivered successfully or fails to report a status code within a predetermined amount of time, IPG 110 can reroute the message to another available and capable aggregator such as aggregator 2 320 over communication line 302. At this point, message aggregator 2 320 can route the user alert message to one or more suitable carriers.

In other embodiments, IPG 110 can send a command to message aggregator 1 310 to queue a user alert message for delivery at a later time. The determination to reroute or queue a user alert message can be based on whether or not the user alert message initiation request contains a "queue flag" set by the entity who initiated the user alert message initiation request. Alternatively, the queue flag can be set by IPG 110 based on the status, availability and other factors of the message aggregators listed in routing table 330.

Some aggregators only return messages to IPG 110 when a user alert message is delivered successfully. In such cases, IPG 110 can maintain a timer with a predetermined time limit for the message to be delivered. In some embodiments, monitoring server 230 can monitor the status of each user alert message using the corresponding MID. In other embodiments, message server 220, Web server 240 or some other server in IPG 110 can monitor the status of each user alert message. If the message is not delivered within the predetermined time limit, IPG 110 can reroute the user alert message using the corresponding MID, the contents of the user alert message initiation request and routing table 330.

In other embodiments, message aggregator 1 310 and message aggregator 2 320 can send updates to IPG 110 regarding their availability, load capacity, supported channels of delivery and current cost for handling and routing a user alert message. In some embodiments, IPG 110 can monitor the availability of one or more message aggregators to verify whether or not the availability flag indicator in routing table 330 is current. This information can then be used by IPG 110 to update routing table 330. Having an up-to-date routing table 330 allows IPG 110 to determine the best possible aggregator to use to deliver any given user alert message. The best possible aggregator can be determined by a number of factors including, but not limited to, the number or type of supported delivery channels, the availability, balance or load index and the cost. The ability to determine the best possible aggregator to use to route any particular user alert message allows IPG 110 to provide cost effective and expedient user alert message services.

Figure 4:
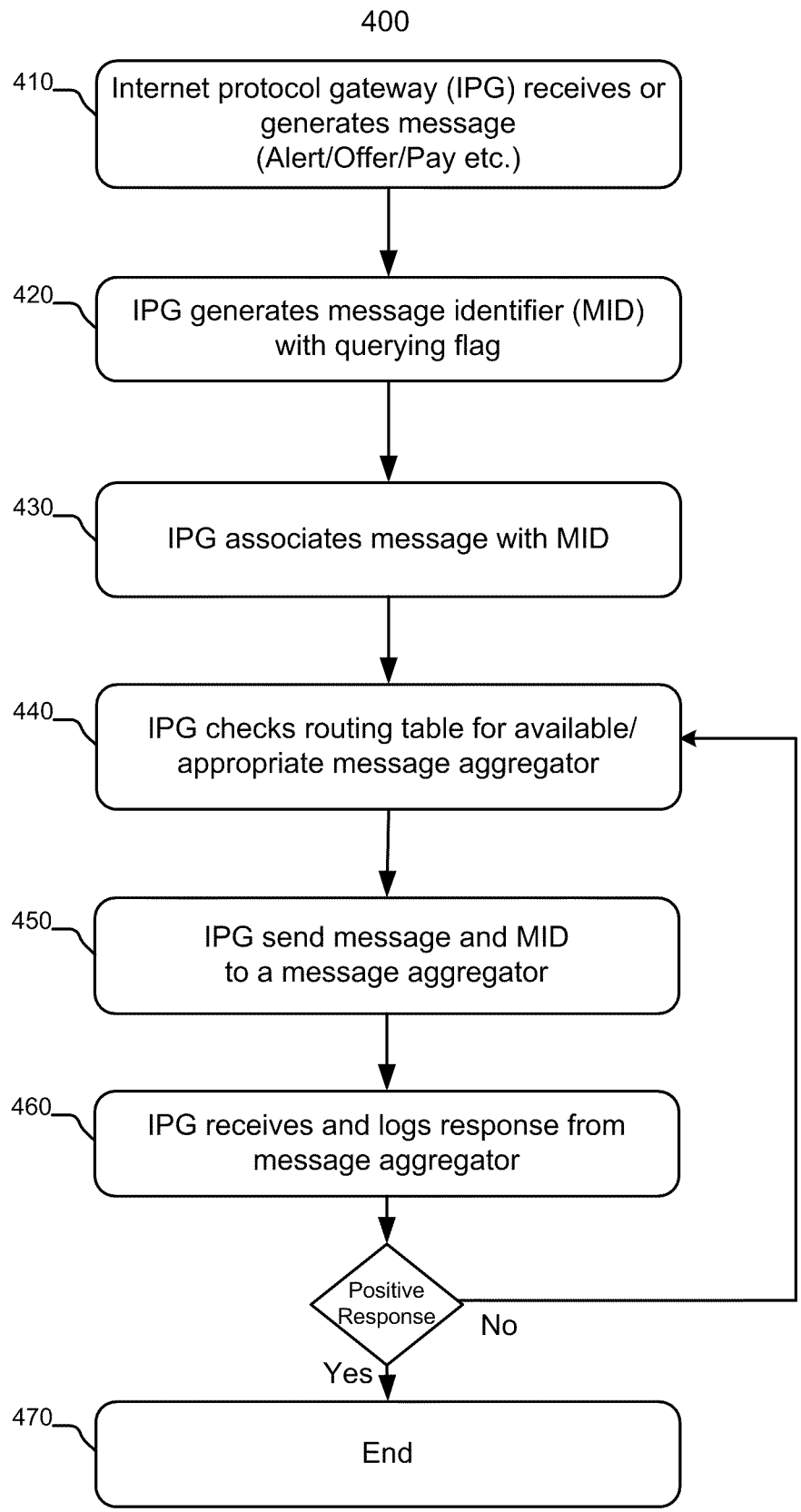
FIG. 4 is a flowchart of a method for delivering user alert messages according to embodiments of the present invention.

FIG. 4 is a flow chart of a method 400 for delivering user alert message according to various embodiments of the present invention. At step 410 IPG 110 can receive a user alert message initiation request or generate a user alert message. As used herein, the user alert message may contain various types of information including, but not limited to, alerts regarding user account activity, availability of special offers, the successful completion of payment transactions, etc. When IPG 110 receives a user alert message initiation request, it can use the information contained in the user alert message initiation request to generate the user alert message. In some embodiments, the user alert message initiation request can include information specifying the delivery address, such as a telephone number, a template identifier, a callback address and specifically formatted information with which to fill the template. In such embodiments, IPG 110 can retrieve the specified template and fill in the user specific information with the information contained in the user alert message initiation request.

Next, in step 420, IPG 110 can generate a transaction identifier (TID) or message identifier (MID) with a querying flag. As used herein the terms transaction identifier and message identifier can be used interchangeably and refer to a unique identifier generated for each user alert message. In step 430, IPG 110 can associate each user alert message generated with an MID. At step 440, IPG 110 can check the routing table 330 for available or suitable message aggregators through which to route delivery of the user alert message. Based on the characteristics, capacity, capability and availability of the message aggregators listed in the routing table 330, IPG 110 can select and send the user alert message in the associated MID to at least one of the message aggregators in step 450. Once IPG 110 has routed the user alert message and the associated MID to a message aggregator, it can wait for a response from the message aggregator.

In some embodiments however, a message aggregator will only return a response to IPG 110 in the events that the message was delivered successfully. In such embodiments, IPG 110 may be configured to wait only for a predetermined amount of time, after which IPG 110 may reroute the user alert message or send a command for the message aggregator to queue the message for a reattempted delivery at a later time.

In either event, IPG 110 can use the MID associated with the user alert message to reroute and/or send a status report regarding the delivery of the user alert message to the entity that sent the initial user alert message initiation request. The association between the MID and user alert message allows IPG 110 to accurately track the routing and delivery of each user alert message. IPG 110 can receive and log responses, which can include a status code, from one or more message aggregators in step 460. Depending on the result reported in the response, IPG 110 can launch a successful delivery of the user alert message or reattempt delivery of the user alert message and start the process over again at step 440. In some embodiments, steps 440, 450 and 460 can be repeated until IPG 110 receives a positive response from one or more message aggregators. Such embodiments ensure that each user alert message has been successfully delivered and provides a reliable and timely delivery of user alert messages to users.

Figure 5:
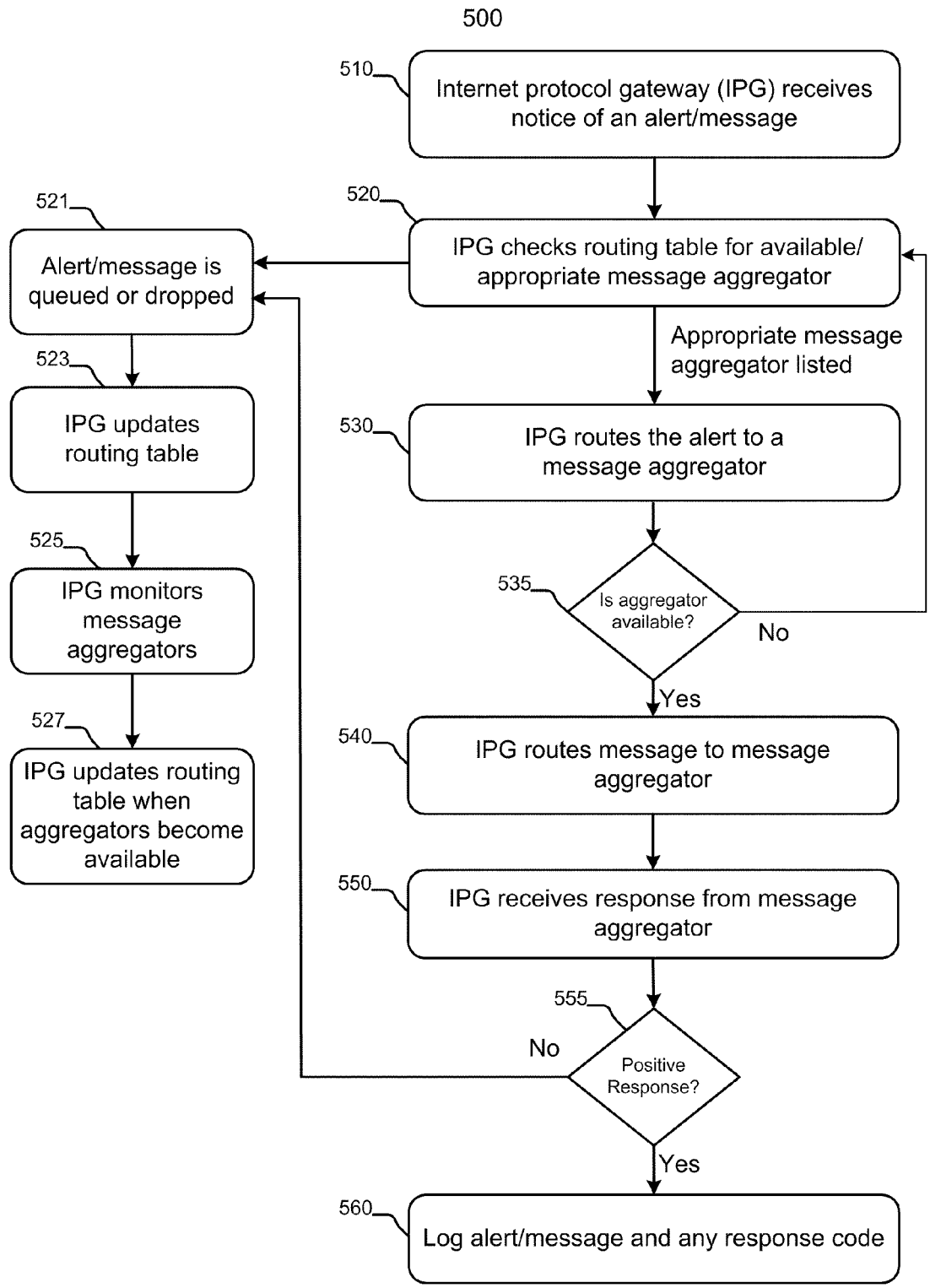
FIG. 5 is a flowchart of a method for delivering user alert messages according to embodiments of the present invention.

FIG. 5 is a flow chart of a method 500 for delivering user alert messages according to various embodiments of the present invention. Similar to method 400, method 500 begins with IPG 110 receiving a notice to generate or relay a user alert message. The notice of the user alert message may be contained in a user alert message initiation request received from one or more servers from within or outside of the network in which IPG 110 is located. In step 520, IPG 110 checks routing table 330 for available and/or appropriate message aggregators through which to route the user alert message. If a suitable message aggregator is listed in routing table 330, and IPG 110 can route the alert message to that specific message aggregator in step 530. In some embodiments, the message aggregator can respond to IPG 110 with a status code indicating whether that particular message aggregator is currently available. In step 535, message aggregator can respond with an indication or status code that the message aggregator is available and IPG 110 can proceed to route the user alert message aggregator in step 540. If however, the message aggregator responds that is not available, i.e. there has been a system crash or communication failure, the message generator can indicate to IPG 110 that it is not available in step 535. In such cases, IPG 110 can recheck the routing table 330 for other available or suitable message aggregators through which to route the user alert message in step 520. Steps 520 through 535 a repeated until the IPG 110 can route it the message to one or more message aggregator in step 540.

Once IPG 110 successfully routes the user alert message to one or more message aggregators, IPG 110 can wait for a response from the message aggregators in step 550. The response received from message aggregators in step 550 can then be examined to determine whether or not the response indicates that the user alert message has been delivered successfully, i.e. a positive response, in step 555. If the response is positive in step 555, IPG 110 can log that the user alert message was delivered successfully. In such embodiments, IPG 110 can log the information regarding the successful delivery with reference to the MID associated with the user alert message. By storing in a log the status of the delivery with associated MID, IPG 110 can quickly and efficiently inform the entity from whom the user alert message initiation request was received that the message was delivered successfully.

If however the response received from the message aggregators in step 555 is negative, then IPG 110 can determine whether or not the user alert message should be queued for delivery at a later time or whether the user alert message, in that it would be no longer be timely or relevant, can be dropped in step 521. In either event, IPG 110 can update routing table 330 with information regarding the availability, status or other characteristic of the message aggregator through which it attempted to route the user alert message in step 523.

In step 525, IPG 110 can monitor the message aggregators or query the message aggregator regarding the status of previously routed user alert messages. In some embodiments, IPG 110 can query the message aggregators to which it has sent user alert messages. The queries can include reference to the MID and/or instructions as to how the message aggregator should respond with regard to the success of the delivery of each user alert message and the associated MID. Additionally in step 525, IPG 110 can monitor the status of multiple message aggregators and then update the routing table 330 and message aggregators when they become available or go offline.

User Alert Messages and User Alert Message Initiation Requests

User alert messages and user alert message initiation requests can include various pieces of information that the IPG 110 and message aggregators can use to correctly route to user alert messages. For example, the user alert message or user alert message initiation request can include the delivery address for one or more user communication devices. Such information can include a phone number, pager number, e-mail address, URL, IP address or any other information required to deliver a timely electronic communication file to one or more users.

In addition, the user alert message or the user alert message initiation request can include payload information. The payload information can include IPG or message aggregator command syntax, command codes, registry codes, message templates identifiers, text, numerical data, format keys or any other information necessary or suitable for generating the content of the user alert message. The user alert message with a user alert message initiation request can also include a "callback address." The callback address can be any type of communication address the user can use to respond to, confirm or question the contents of the user alert message. The callback address can include a URL, a telephone number, an SMS number or other suitable information that a user can use to contact the entity that initiated the user alert message. Such capability allows the end-user to actually interact with, react to or take action in response to the contents of a user alert message. For example, a user may receive a user alert message in the form of an SMS message on a mobile phone informing him or her that a credit card transaction in an amount greater than $500 has been processed by his or her credit card issuer. In such a scenario, the user alert message can include a callback telephone number as part of the payload information of the user alert message that the user can use to call the issuer to either refute or confirm the transaction.

Furthermore, the payload of the user alert message can also include a secret password or key word known only to the user and the entity requesting the delivery of the user alert message to help verify the message to the user. Users can choose a personalized password or PIN to be delivered with any or all user alert messages sent to the user so that the user will know that an authorized entity sent user alert message. For example, the credit card user may set up a user alert message notification account with his or her credit card issuer. During the setup, the user can select a unique or personalized password, such as "mushmouth," to be included in any user alert messages sent to the user from the user's credit card issuer. In this way, the user can be confident that the user alert message was in fact initiated by the user's credit card issuer and not some other entity who may be trying to defraud the user.

User alert messages and user alert message initiation requests can also include a "queue flag" to indicate to the IPG 110 or a message aggregator whether or not the entity who initiated the consumer alert message wants the consumer alert message to be queued in the events that all available message aggregators are backed-up or off-line. If the queue flag is flipped to a positive or "on" position, then the user alert message will be queued at either the IPG or one or more message aggregators until such time it can be delivered successfully to the intended users. If however, the queue flag is negative or "off" position, then the user alert message will be dropped if after the user alert message fails to be delivered to the intended user after some predetermined amount of time or some number of attempted deliveries. Requesting entities may request that a user alert message be dropped if the alert message would only be useful to a user if delivered in a timely fashion. By reducing the number of alerts message that will ultimately be delivered, dropping alert messages allows for the messages that will be queued for delivery to be delivered in a more expedient manner.

Figure 6:
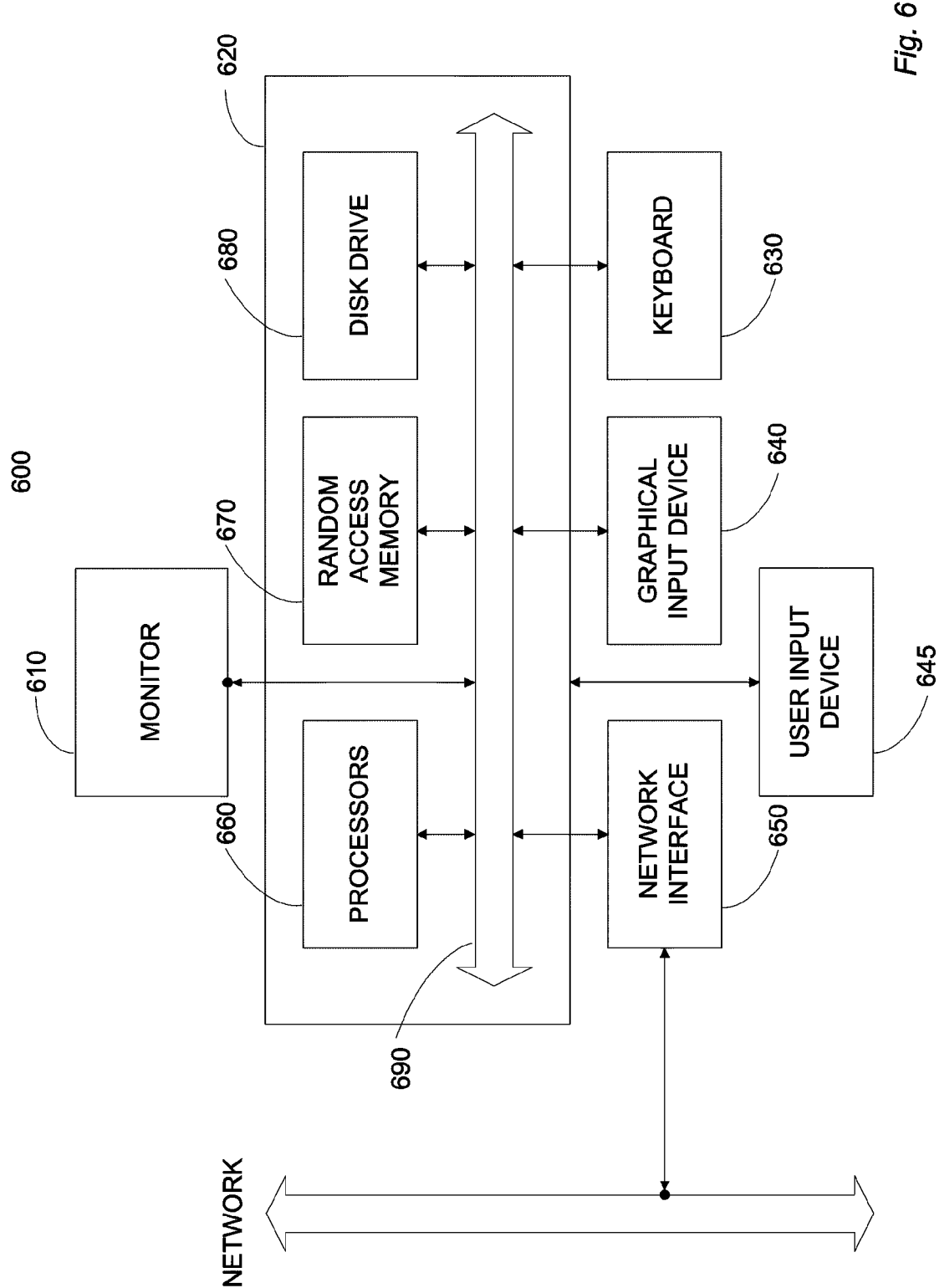
FIG. 6 is a schematic of a computer system that can be used to implement embodiments of the present invention.

FIG. 6 is a block diagram of typical computer system 600 configured to execute computer readable code to implement various functions and steps according to various embodiments of the present invention.

System 600 is representative of a computer system capable of embodying the present invention. The computer system can be present in any of the elements in FIGS. 1 through 3, including the IPG 110, and message aggregator 310 described above. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Xeon™, Pentium™ or Core™ microprocessors; Turion™ 64, Opteron™ or Athlon™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board. Various embodiments may be based upon systems provided by daVinci, Pandora, Silicon Color, or other vendors.

In one embodiment, computer system 600 typically includes a display 610, computer 620, a keyboard 630, a user input device 640, communication or network interface 650, and the like. In various embodiments, display (monitor) 610 may be embodied as a CRT display, an LCD display, a plasma display, a direct-projection or rear-projection DLP, a microdisplay, or the like. In various embodiments, display 610 may be used to display user interfaces and rendered images.

In various embodiments, user input device 640 is typically embodied as a computer mouse, a trackball, a track pad, a joystick, wireless remote, drawing tablet, voice command system, and the like. User input device 640 typically allows a user to select objects, icons, text and the like that appear on the display 610 via a command such as a click of a button or the like. An additional specialized user input device 645, such a magnetic stripe, RFID transceiver or smart card reader may also be provided in various embodiments. In other embodiments, user input device 645 include additional computer system displays (e.g. multiple monitors). Further user input device 645 may be implemented as one or more graphical user interfaces on such a display.

Embodiments of computer interfaces 650 typically include an Ethernet card, a modem (telephone, satellite, cable, ISDN), (asynchronous) digital subscriber line (DSL) unit, FireWire interface, USB interface, and the like. For example, computer interfaces 650 may be coupled to a computer network, to a FireWire bus, or the like. In other embodiments, computer interfaces 650 may be physically integrated on the motherboard of computer 620, may be a software program, such as soft DSL, or the like.

RAM 670 and disk drive 680 are examples of computer-readable tangible media configured to store data such user, account and transaction level data, calculated aggregated data, super keys, sub keys and other executable computer code, human readable code, or the like. Other types of tangible media include magnetic storage media such as floppy disks, networked hard disks, or removable hard disks; optical storage media such as CD-ROMS, DVDs, holographic memories, or bar codes; semiconductor media such as flash memories, read-only-memories (ROMS); battery-backed volatile memories; networked storage devices, and the like.

In the present embodiment, computer system 600 may also include software that enables communications over a network such as the HTTP, TCP/IP, RTP/RTSP protocols, and the like. In alternative embodiments of the present invention, other communications software and transfer protocols may also be used, for example IPX, UDP or the like.

In various embodiments, computer 620 typically includes familiar computer components such as a processor 660, and memory storage devices, such as a random access memory (RAM) 670, disk drives 680, and system bus 690 interconnecting the above components.

In some embodiments, computer 600 includes one or more Xeon microprocessors from Intel. Further, in the present embodiment, computer 620 typically includes a UNIX-based operating system.

It should be understood that embodiments of the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A communication gateway for delivering messages comprising:
   a server computer comprising (a) a processor; (b) a computer readable medium coupled to the processor, the computer readable medium comprising code for causing the processor to implement a method comprising receiving a message initiation request, generating an alert message based on the message initiation request and a routing table, generating a message ID, associating the message ID with the alert message, sending the alert message and the message ID to a first message aggregator based on the routing table, and monitoring a status code related to the message ID; and (c) a communication interface coupled to the processor;
   wherein the method further comprises sending a command to reroute the alert message to a second message aggregator based on the message ID, the status code and the routing table;
   wherein generating the alert message based on the message initiation request comprises parsing the message initiation request to obtain a delivery address, and a content payload comprising a callback address; and
   wherein sending the alert message and the message ID to the first message aggregator further comprises requesting the first message aggregator to route the message to the delivery address.

2. The communication gateway of claim 1 wherein the method further comprises logging the message ID and the status code.

3. The communication gateway of claim 2 wherein the method further comprises queuing the alert message based on the message ID, the status code and the routing table.

4. The communication gateway of claim 3 wherein queuing the alert message is further based on a queue flag.

5. The communication gateway of claim 1 wherein the method further comprises updating the routing table.

6. A method for delivering messages comprising:
   receiving a message initialization request at a communication gateway;
   generating an alert message based on the message initialization request and a routing table using the communication gateway;
   generating a message ID using the communication gateway;
   associating the message ID with the alert message using the communication gateway;
   sending the alert message and the message ID from the communication gateway to a first message aggregator based on the routing table;
   monitoring a status code related to the message ID using the communication gateway; and
   sending a command to reroute the alert message to a second message aggregator based on the message ID, the status code and the routing table using the communication gateway;
   wherein generating the alert message based on the message initialization request comprises parsing the message initialization request to obtain a delivery address, and a content payload comprising a callback address; and
   wherein sending the alert message and the message ID to the first message aggregator further comprises requesting the first message aggregator to route the message to the delivery address.

7. The method of claim 6 further comprising resending the alert message and the message ID to the first message aggregator based on the status code, the message ID and the routing table using the communication gateway.

8. The method of claim 6 further comprising logging the status code and the message ID using the communication gateway.

9. The method of claim 6 further comprising queuing the alert message based on the status code, the message ID and the routing table and a queue flag using.

10. The method of claim 9 wherein the alert message is queued using a server in the communication gateway.

11. The method of claim 9 wherein the alert message is queued using the first message aggregator.

12. The method of claim 6 further comprising updating the routing table using the communication gateway.

13. The method of claim 6 wherein sending the alert message further comprises sending a queue flag.

14. The method of claim 6 wherein sending the alert message further comprises sending a request to deliver a user password.

* * * * *